July 8, 1958 R. THEDIECK 2,842,724

CONDUCTOR DEVICES AND METHOD OF MAKING THE SAME

Filed Aug. 18, 1953 2 Sheets-Sheet 1

Inventor:
Reiner Thedieck
by Michael S. Striker
Attorney

Inventor:

United States Patent Office 2,842,724

Patented July 8, 1958

2,842,724

CONDUCTOR DEVICES AND METHOD OF MAKING THE SAME

Reiner Thedieck, Belecke (Mohne), Germany, assignor to Licentia Patent-Verwaltungs-G. m. b. H., Hamburg, Germany Application August 18, 1953, Serial No. 374,943

Claims priority, application Germany August 18, 1952

18 Claims. (Cl. 317—235)

The present invention relates to electrical conductor devices, and more particularly is concerned with controllable electrically unsymmetrically conductive systems.

In known devices of the above type, there is the disadvantage generally that such devices are very sensitive to mechanical influences, such as vibration or heat expansion occurring during their operation. This difficulty is particularly true with respect to the contact of the so-called collector electrode which has a rectifying action with respect to the base, and on the stability of which particularly great demands must be placed.

It is an object, therefore, of the present invention to provide a device of the above type which avoids the above disadvantages.

It is another object of the present invention to provide a device of the above type wherein point electrodes may be secured firmly to the semi-conductor body of which the device is formed.

It is still another object of the present invention to provide a method of making a conductor device of the above type which produces a device which is relatively free of impurities.

Other objects and advantages will become apparent from the following description and the appended claims.

With the above objects in view, the present invention mainly consists, in combination in a controllable electrically unsymmetrically conductive device, of a semi-conductor body including a main body portion, and a surface region portion in the main body portion adjacent to one face thereof and formed with a recess therein, one of the portions being p-conductive and the other of the portions being n-conductive, a first electrode extending into the recess and being in contact with the surface region portion, and a second electrode in contact with the semi-conductor body spaced from the surface region portion.

Preferably, in accordance with the invention, the recess is crater-shaped, the recess being formed by the process which changes the conductivity characteristics of one portion of the semi-conductor body with respect to another portion thereof, and the electrodes inserted into the recesses are preferably of the point electrode type and are fused, welded, or soldered to the surface region portion within the recess therein. The electrode connected within the recess is preferably formed of wire and is connected to the wall of the recess by means of metal solder, the connection being made by means of a passage of current. The end of the wire and of the metal solder may be, for example, made of nickel or of an alloy of nickel. In many cases it is particularly advantageous if the end of the wire electrode or the metal solder, or both, consist of a noble metal, preferably gold, or an alloy of a noble metal.

The stability of the connection is particularly enhanced if the electrode and the metal solder occupy the major portion of the recess in the surface region portion.

The minimum distance between the above-mentioned second electrode, which constitutes an emitter electrode as distinguished from the first electrode which constitutes a collector electrode, and the boundary of the surface region portion of the semi-conductor body is preferably several microns or several hundredths of a millimeter. The material of which the emitter electrode is made may suitably be tungsten.

In addition to the electrodes above mentioned, further electrodes may be provided to serve as auxiliary or control electrodes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
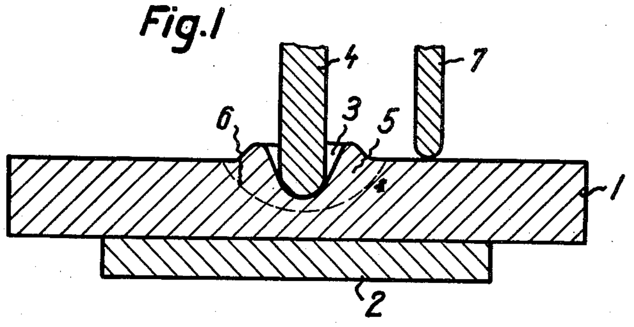
Fig. 1 is a sectional view in elevation of an embodiment of the present invention.

Referring now to the drawings and particuarly to Fig. 1, an n-conductive germanium block 1 is shown lying on a base electrode 2 and having a crater-shaped recess 3 formed therein in which collector electrode 4 is introduced. Recess 3 is formed in a p-conductive surface region portion 5 of germanium block 1, blocking layer 6 indicated by an interrupted line forming the boundary of the surface region portion 5 which separates portion 5 from the remainder of the semi-conductor body 1.

The walls of recess 3 consist of p-conductive material which results from treatment of n-conductive germanium by heating the same, as by means of a passage of current. An emitter electrode 7 is arranged on the n-conductive portion of germanium block 1, and it is spaced from the boundary of surface region portion 5, as indicated by line 6, a distance of several microns or several hundredths of a millimeter.

Figure 2:
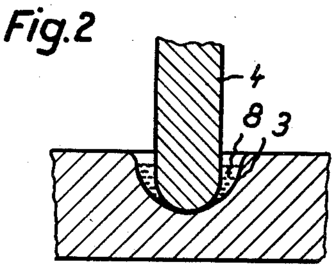
Fig. 2 is a detailed sectional view showing the connection of the collector electrode shown in Fig. 1.

Fig. 2 shows in detail the manner in which collector electrode 4 is connected to surface region portion 5 within recess 3 thereof. As shown in Fig. 2 metallic solder 8 is used to connect the collector electrode 4 to the surface region portion 5, and as shown in the figure, metal solder 8 fills most of the space remaining in recess 3 between collector 4 and the walls of recess 3.

While the semi-conductor body has been described as being of germanium, other types of semi-conductor bodies may be used, such as silicon. The above described device as well as the devices described elsewhere in the specification may be used generally in or as controllable electrically unsymmetrically conductive systems, and preferably as transistors.

In a further embodiment of the present invention two recesses, preferably crater-shaped, may be provided in the semi-conductor body instead of one as above described, an electrode being connected into each recess, one being a collector electrode and the other being an emitter electrode. Either one or both electrodes may be of the point electrode type. The electrodes in this embodiment of the invention are likewise advantageously connected into their respective recesses in the manner above described with respect to the embodiment shown in Figs. 1 and 2.

The minimum distance between the boundaries of the surface region portions containing the two recesses is advantageously several microns or several hundredths of a millimeter. In this embodiment, auxiliary or control electrodes may be provided on the semi-conductor body in addition to those electrodes already mentioned.

Figure 3:
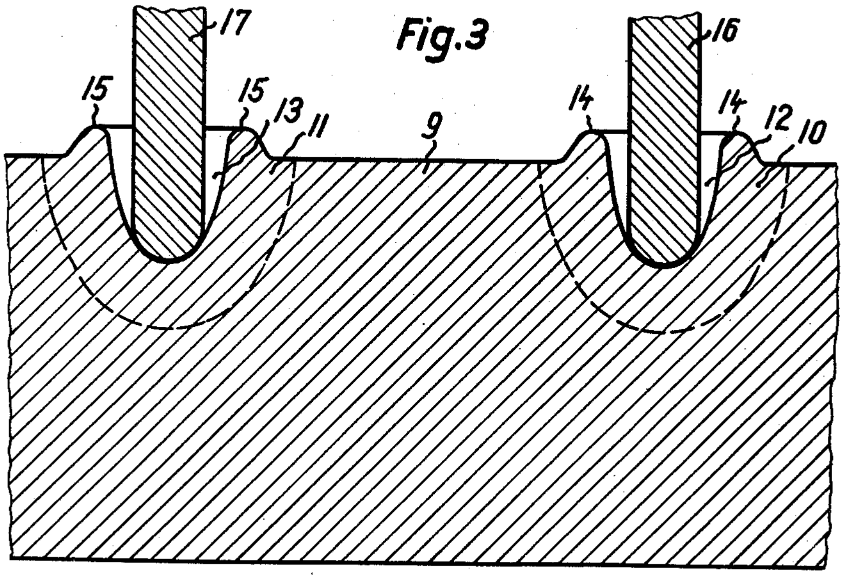
Fig. 3 is a sectional view in elevation of another embodiment of the present invention.
Figures 4, 5, 6:
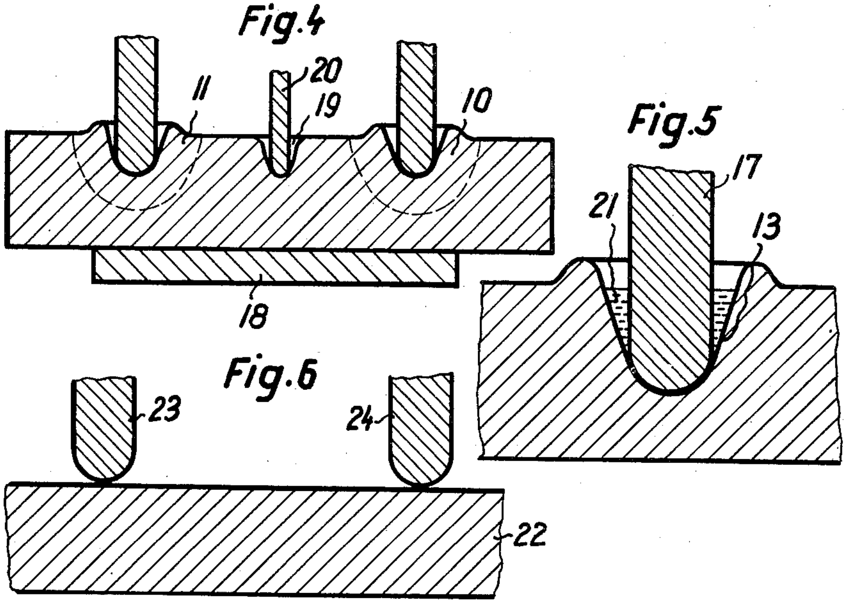
Fig. 4 is a sectional view of still another embodiment of the present invention similar to that shown in Fig. 3.
Fig. 5 is a detailed sectional view of the connection of one of the electrodes shown in Figs. 3 and 4.
Fig. 6 is a sectional view in elevation of the arrangement showing a preliminary step in a method according to the present invention.

Figs. 3–5 show arrangements of this embodiment, and in Fig. 3 there is shown an n-conductive germanium block 9 which has two p-conductive zones 10 and 11 on its surface. Zones 10 and 11 may be made p-conductive by the heat resulting from the treatment of the n-conductive germanium block by means of a passage of current.

As shown in Fig. 3, each of zones 10 and 11 are formed with two crater-shaped recesses 12 and 13, the walls of which consist of p-conductive germanium. These crater-shaped recesses are, for example 10 microns deep and have at about the level of the adjacent surface of the semi-conductor body a diameter of about 10 microns. The rims 14 and 15 of the crater-shaped recesses project a few microns above the adjacent semi-conductor body surface. In recesses 12 and 13, electrodes 16 and 17 are inserted and secured to their respective zones, one of the electrodes being a collector electrode and the other being an emitter electrode.

Fig. 4 shows a conductor system similar to that of Fig. 3 except that the position of base electrode 18 is indicated and there is arranged between the p-conductive zones 10 and 11 a supplementary auxiliary or control electrode 20 in a separate recess 19 in a portion of the semi-conductor body which does not consist of p-conductive material.

Fig. 5 is a detailed view showing the manner in which the electrodes such as shown in Figs. 3 and 4, e. g., electrode 17, is arranged in and connected to the recessed zone by means of metal solder. As is seen from Fig. 5, metal solder 21 occupies the greatest portion of the space in recess 13 between the electrode 17 and the wall of recess 13.

The present invention also concerns a method of making electrically unsymmetrically conductive systems of semi-conductor material having high melting points, such as germanium or silicon, particularly of diodes, surface type rectifiers or controllable semi-conductors, and preferably transistors, which includes the steps of treating a semi-conductor body to produce different conductivity characteristics between a surface region portion of the semi-conductor body adjacent one face thereof and the remainder of the semi-conductor body while forming at least one recess in the surface region portion, removing at least partially the outer surface of the one face of the semi-conductor body, and connecting an electrode to the surface region portion of the semi-conductor body within the recess therein.

In the process above described, not only is the unavoidable contamination of the surface of the semi-conductor removed, but also the recessed portions which result from the treatment of the semi-conductor body are cleaned, the recesses being formed, for example, by thermally treating the semi-conductor body by means of a current impulse using special point electrodes which are placed on the semi-conductor to form the recess. After such treatment there remains in the recesses impurities produced by the treatment, for example, remains of the point electrodes or alloys, which contain semi-conductor material. Since the entire wall of the crater-shaped recesses consists, after such treatment, of a material having conductivity characteristics which are opposite to those of the remainder of the semi-conductor material, these impurities produce disturbing influences in the operation of the device, since they influence in an uncontrollable manner the conductivity characteristics of the wall of the recess.

A favorable treatment of the semi-conductor to transform its conductivity characteristics consists in a localized thermal treatment thereof and/or in treating it with ions or atoms of substances which influence the conductivity characteristics of the semi-conductor body so treated. Such substances may include gallium or antimony.

It is particularly advantageous to thermally treat the semi-conductor body by means of a charge carrier beam and/or by means of a passage of current.

It is preferable to carry out the surface removal treatment in such manner that the surface of the semi-conductor body outside of the transformed zones, which constitute the surface region portion which has been treated as above described to produce conductivity characteristics therein which are different from those of the remainder of the semi-conductor body, is removed to a greater extent than the surface of the transformed zones. The removal process can be carried out by chemical as well as by electro-chemical means. Particularly suitable for cleaning germanium surfaces by a chemical removal process is a mixture of hydrofluoric acid, nitric acid, copper nitrate and water. In the electro-chemical removal process for treating a germanium crystal, an electrolyte has been found satisfactory which contains or consists of orthophosphoric acid in water solution, and such a solution in particular which contains 10–70% $H_3PO_4$, 45% of $H_3PO_4$ being a preferable content. After such surface removal, it is advantageous to subject the entire semi-conductor body to a thermal after-treatment, which may be carried out in an atmosphere of protective gas or in a vacuum.

The method according to the present invention is of particular value in treating a semi-conductor crystal on which two or more adjacent transformed zones are provided which have conductivity characteristics different from the rest of the crystal, the transformed zones overlapping each other as a result of the treatment for producing these differing conductivity characteristics. In treating a crystal which is thus formed, the surface of the transformed zones is removed to such an extent that the overlapping portion between the transformed zones is removed. The removal process may be so carried out that a minimum distance between the boundaries of the transformed zones may be obtained. This minimum distance may be several microns or several hundredths of a millimeter.

After the removal process, an electrode is mounted on each of the transformed zones. It has been found particularly satisfactory to use electrodes which consist at least at their contact surfaces of nickel or a nickel-containing alloy. In many cases it has been found suitable to use electrodes which consist at least at their contact surfaces of a noble metal, preferably of gold, or of an alloy containing a noble metal.

The electrodes are advantageously of the point electrode type, and they may be introduced in such form into the corresponding recesses in the semi-conductor body. In addition, one or more additional electrodes may be placed on the part of the semi-conductor body which has not been transformed, but in the immediate vicinity of the recess or recesses, which are preferably crater-shaped.

The method according to the present invention is particularly suitable for the manufacture of diodes, surface type rectifiers or controllable semi-conductors, and preferably for the manufacture of transistors.

Figure 7:
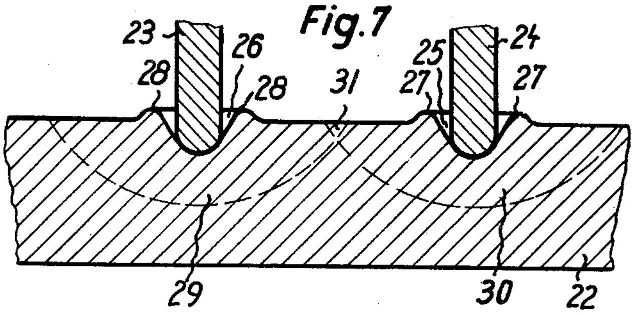
Fig. 7 shows the arrangement of the parts illustrated in Fig. 6 after a subsequent treatment thereof.
Figure 8:
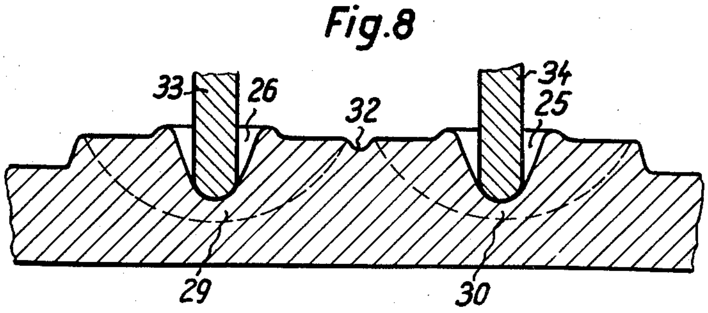
Fig. 8 shows the final arrangement resulting from the method carried out according to the present invention.

Figs. 6–8 show three steps in the manufacture of controllable semi-conductors in accordance with the present invention.

In Fig. 6 there is shown, for example, an n-conductive germanium block 22 on which two point electrodes 23 and 24 are placed for the purpose of forming the crater-shaped recesses in accordance with the invention.

Fig. 7 shows the system after a current has been passed through the point electrodes 23 and 24. Point electrodes 23 and 24 are pressed into germanium block 22 a certain distance during this step, so as to form two crater-shaped recesses 25 and 26, which are encircled at the surface of the semi-conductor by crater walls 27 and 28. As a result of the heating of the germanium block by the passage of current, two transformed zones 29 and 30 are produced which overlap one another in a small zone 31. Then the point electrodes 23 and 24 are removed and the surface removal and cleaning process is undertaken.

Fig. 8 shows the finished system. Transformed zones 29 and 30, as is seen from the figure, have had their surfaces removed to a lesser extent that the remaining surface of the germanium block, so that the overlapping portion 31 is removed as shown at 32 which indicates the distance separating the zones 29 and 30. Point electrodes 33 and 34, which may consist, for example, of gold, are introduced into crater-shaped recesses 25 and 26, the walls of which now consist entirely of p-conductive germanium, and the electrodes are secured to the walls in the manner above described.

It will be understood that each of the elements described above, or two or more together, may also find a useful application in other types of conductor devices differing from the types described above.

While the invention has been illustrated and described as embodied in unsymmetrically conductive devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first electrode extending into said crater-shaped recess and being fused therein in contact with said surface region portion; and a second electrode in contact with said semi-conductor body spaced from said surface region portion.

2. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in electrically welded contact with said surface region portion; and a second electrode in contact with said semi-conductor body spaced from said surface region portion.

3. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in contact with said surface region portion, said wire electrode being connected to the wall of said recess by metal solder; and a second electrode in contact with said semi-conductor body spaced from said surface region portion.

4. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in contact with said surface region portion, said wire electrode being connected to the wall of said recess by metal solder, the end of said wire electrode and the metal solder being composed of a metal selected from the group consisting of nickel and alloys of nickel; and a second electrode in contact with said semi-conductor body spaced from said surface region portion.

5. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in contact with said surface region portion, said wire electrode being connected to the wall of said recess by metal solder, the end of said wire electrode and the metal solder being composed of a metal selected from the group consisting of noble metals and alloys of noble metals; and a second electrode in contact with said semi-conductor body spaced from said surface region portion.

6. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in contact with said surface region portion, said wire electrode being connected to the wall of said recess by metal solder, the end of said wire electrode and the metal solder being composed of gold; and a second electrode in contact with said semi-conductor body spaced from said surface region portion.

7. In a controllable electrically unsymmetrically conductive device, in combination, a semi-conductor body including a main body portion, and a surface region portion in said main body portion adjacent to one face thereof and formed with a crater-shaped recess therein, one of said portions being p-conductive and the other of said portions being n-conductive; a first wire electrode extending into said crater-shaped recess and being in contact with said surface region portion, said wire electrode being connected to the wall of said recess by metal solder, the major portion of said recess being occupied by said electrode and said metal solder; and a second electrode in contact with said semi-conductor body spaced from said surface region portion.

8. In a controllable electrically unsymmetrically conductive device, in combination, a semi-conductor body including a main body portion, and a surface region portion in said main body portion comprising two spaced zones adjacent to one face of said main body portion, each of said zones being formed with a recess therein, one of said portions being p-conductive and the other of said portions being n-conductive; and electrodes extending into said recesses and being in contact with the zones of said surface region portion.

9. In a controllable electrically unsymmetrically conductive device, in combination, a semi-conductor body including a main body portion, and a surface region portion in said main body portion comprising two spaced zones adjacent to one face of said main body portion, each of said zones being formed with a crater-shaped recess therein, one of said portions being p-conductive and the other of said portions being n-conductive; and electrodes extending into said crater-shaped recesses and being in contact with the zones of said surface region portion.

10. In a controllable electrically unsymmetrically conductive device, in combination, a semi-conductor body including a main body portion, and a surface region portion in said main body portion comprising two spaced zones adjacent to one face of said main body portion, each of said zones being formed with a crater-shaped recess therein, one of said portions being p-conductive and the other of said portions being n-conductive; and electrodes extending into said crater-shaped recesses and being in contact with the zones of said surface region portion, at least one of said electrodes being a point electrode.

11. In a controllable electrically unsymmetrically conductive device, in combination, a semi-conductor body including a main body portion, and a surface region portion in said main body portion comprising two spaced zones adjacent to one face of said main body portion, each of said zones being formed with a crater-shaped recess therein, one of said portions being p-conductive and the other of said portions being n-conductive; and electrodes extending into said crater-shaped recesses and being in contact with the zones of said surface region portion, at least one of said electrodes being fused to its respective zone.

12. In a controllable electrically unsymmetrically conductive device, in combination, a semi-conductor body including a main body portion, and a surface region portion in said main body portion comprising two spaced zones adjacent to one face of said main body portion, the minimum distance between the boundaries of said zones being several microns, each of said zones being formed with a crater-shaped recess therein, one of said portions being p-conductive and the other of said portions being n-conductive; and electrodes extending into said crater-shaped recesses and being in contact with the zones of said surface region portion.

13. In a controllable electrically unsymmetrically conductive device, in combination, a semi-conductor body including a main body portion, and a surface region portion in said main body portion comprising two spaced zones adjacent to one face of said main body portion, the minimum distance between the boundaries of said zones being several hundredths of a millimeter, each of said zones being formed with a crater-shaped recess therein, one of said portions being p-conductive and the other of said portions being n-conductive; and electrodes extending into said crater-shaped recesses and being in contact with the zones of said surface region portion.

14. In a controllable electrically unsymmetrically conductive device, in combination, a semi-conductor body including a main body portion having at least one opening in its surface, and a surface region portion in said main body portion comprising two spaced zones adjacent to one face of said main body portion, each of said zones being formed with a crater-shaped recess therein, one of said portions being p-conductive and the other of said portions being n-conductive; main electrodes extending into said crater-shaped recesses and being in contact with the zones of said surface region portion; a base electrode mounted on said main body portion of said semi-conductor body; and at least an additional electrode mounted on said main body portion extending into said opening therein.

15. In a controllable electrically unsymmetrically conductive device, in combination, a semi-conductor body including an n-conductive main body portion, and a p-conductive surface region portion in said main body portion comprising two spaced p-conductive zones adjacent to one face of said main body portion, each of said zones being formed with a recess therein; and electrodes extending into said recesses and being in contact with the zones of said surface region portion.

16. A method of making a controllable electrically unsymmetrically conductive device from a semi-conductor body having a predefined conductivity characteristic, comprising the steps of producing in a surface region portion of said semi-conductor body two overlapping zones adjacent one face of said semi-conductor body, said overlapping zones having conductivity characteristics different from said predefined conductivity characteristic while simultaneously forming crater-shaped recesses in said zones of said surface region portion; and removing at least partially the outer surface of said one face of said semi-conductor body while removing the overlapping portions of said zones.

17. A method of making a controllable electrically unsymmetrically conductive device from a semi-conductor body having a predefined conductivity characteristic, comprising the steps of producing in a surface region portion of said semi-conductor body two overlapping zones adjacent one face of said semi-conductor body, said overlapping zones having conductivity characteristics different from said predefined conductivity characteristic; and removing at least partially the outer surface of said one face of said semi-conductor body while removing the overlapping portions of said zones, said outer surface being removed to such an extent that the minimum distance between the boundaries of said zones is several microns.

18. A method of making a controllable electrically unsymmetrically conductive device from a semi-conductor body having a predefined conductivity characteristic, comprising the steps of producing in a surface region portion of said semi-conductor body two overlapping zones adjacent one face of said semi-conductor body, said overlapping zones having conductivity characteristics different from said predefined conductivity characteristic; and removing at least partially the outer surface of said one face of said semi-conductor body while removing the overlapping portions of said zones, said outer surface being removed to such an extent that the minimum distance between the boundaries of said zones is several hundredths of a millimeter.

References Cited in the file of this patent

UNITED STATES PATENTS

| | | |
|---|---|---|
| 2,561,411 | Pfann | July 24, 1951 |
| 2,586,080 | Pfann | Feb. 19, 1952 |
| 2,597,028 | Pfann | May 20, 1952 |
| 2,617,865 | Bardeen et al. | Nov. 11, 1952 |
| 2,654,059 | Shockley | Sept. 29, 1953 |
| 2,764,642 | Shockley | Sept. 25, 1956 |